United States Patent [19]

Meiller et al.

[11] Patent Number: 5,776,227
[45] Date of Patent: Jul. 7, 1998

[54] VAPOR STORAGE CANISTER WITH FOAM SCREEN RETAINER

[75] Inventors: Thomas Charles Meiller, Pittsford; Timothy Michael Beadnell, Avon; Charles Henry Covert, Manchester; Robert Augustine Zaso; Gordon Richard Paddock, both of Rochester, all of N.Y.

[73] Assignee: General Motors Corporation, Detroit, Mich.

[21] Appl. No.: 818,018

[22] Filed: Mar. 14, 1997

[51] Int. Cl.$^6$ .................................................. B01D 53/04
[52] U.S. Cl. ............................ 96/134; 96/139; 96/141; 96/144; 96/152; 123/519
[58] Field of Search ........................... 55/134, 135, 137, 55/139, 140, 141, 142, 143, 144, 147, 149, 152, 385.3; 95/146; 123/519

[56] References Cited

U.S. PATENT DOCUMENTS

| | | | |
|---|---|---|---|
| 4,193,383 | 3/1980 | Rogers | 96/139 |
| 4,306,894 | 12/1981 | Fukami et al. | 96/131 |
| 4,308,840 | 1/1982 | Hiramatsu et al. | 123/519 |
| 4,331,120 | 5/1982 | Hiramatu et al. | 123/519 |
| 4,338,106 | 7/1982 | Mizuno et al. | 96/139 |
| 4,381,929 | 5/1983 | Mizuno et al. | 96/130 |
| 4,386,947 | 6/1983 | Mizuno et al. | 96/137 |
| 4,403,587 | 9/1983 | Mizuno et al. | 123/519 |
| 4,430,099 | 2/1984 | Yanagisawa et al. | 96/139 |
| 4,446,838 | 5/1984 | Suzuki et al. | 123/520 |
| 4,454,849 | 6/1984 | Mizuno et al. | 123/519 |
| 4,496,379 | 1/1985 | Kozawa | 96/130 |
| 4,507,132 | 3/1985 | Yoshida | 55/320 |
| 4,598,686 | 7/1986 | Lupoli et al. | 123/519 |
| 4,750,465 | 6/1988 | Rediker, Jr. et al. | 123/519 |
| 4,758,255 | 7/1988 | Yamada et al. | 96/137 |
| 4,766,872 | 8/1988 | Kato et al. | 123/519 |
| 4,778,495 | 10/1988 | Bishop et al. | 55/269 |
| 4,853,009 | 8/1989 | Turner et al. | 96/144 |
| 4,877,001 | 10/1989 | Kenealy et al. | 123/519 |
| 4,951,643 | 8/1990 | Sato et al. | 123/520 |
| 4,962,744 | 10/1990 | Uranishi et al. | 123/520 |
| 5,098,453 | 3/1992 | Turner et al. | 123/519 |
| 5,170,765 | 12/1992 | Hoshino et al. | 123/520 |
| 5,173,095 | 12/1992 | Yasukawa et al. | 96/122 |
| 5,304,235 | 4/1994 | Watanabe et al. | 96/144 |
| 5,355,861 | 10/1994 | Arai | 123/519 |
| 5,361,743 | 11/1994 | Denz et al. | 123/519 |
| 5,373,830 | 12/1994 | Denz et al. | 123/520 |
| 5,453,118 | 9/1995 | Heiligman | 96/147 |
| 5,456,236 | 10/1995 | Wakashiro et al. | 123/519 |
| 5,460,136 | 10/1995 | Yamazaki et al. | 123/519 |
| 5,632,808 | 5/1997 | Hara et al. | 96/137 |
| 5,641,344 | 6/1997 | Takahashi et al. | 123/519 |

FOREIGN PATENT DOCUMENTS

| | | | |
|---|---|---|---|
| 556488 | 8/1993 | European Pat. Off. | 123/519 |
| 3828602 | 3/1990 | Germany | 96/144 |
| 55-99318 | 7/1980 | Japan | 96/144 |
| 58-200070 | 11/1983 | Japan | 123/519 |
| 1-134058 | 5/1989 | Japan | 123/519 |

Primary Examiner—Duane S. Smith
Attorney, Agent, or Firm—Saul Schwartz

[57] ABSTRACT

A fuel vapor storage canister having a screen assembly between a mass of carbon granules in the storage canister and a purge port of the storage canister. The fuel vapor storage canister includes a cup-shaped plastic body defining a carbon bed chamber and a plenum in the canister body covered by the screen assembly. The screen assembly includes a pair of concentric cylindrical bosses around the plenum, a plastic foam screen over the plenum seated on a circular edge of each of the concentric cylindrical bosses, and a retainer having a plurality of flexible barbs and flexible reinforcements resiliently biased against opposite sides of the outermost one of the cylindrical bosses. Concentric circular segments of the plastic foam screen are compressed tightly between an annular planar side of the retainer and each of the circular edges of the concentric cylindrical bosses to positively prevent migration of carbon granules around the foam screen. The barbs prevent dislodgment of the retainer from the outermost one of the cylindrical bosses. The reinforcements protect the integrity of the retention of the barbs by preventing creep of the outermost one of the cylindrical bosses attributable to the forces exerted thereon by the barbs.

2 Claims, 4 Drawing Sheets

5,776,227

1

VAPOR STORAGE CANISTER WITH FOAM SCREEN RETAINER

TECHNICAL FIELD

This invention relates to fuel vapor storage canisters in motor vehicle evaporative emission control systems.

BACKGROUND OF THE INVENTION

Typical motor vehicle evaporative emission control systems include a fuel vapor storage canister, a mass of carbon granules in the storage canister, a vapor transfer duct between a vapor inlet port of the storage canister and a fuel tank of the motor vehicle, a canister purge duct between a motor of the vehicle and a purge port of the storage canister, and a solenoid valve in the canister purge duct. When the motor is on, the solenoid valve opens the canister purge duct to induce a flow of air through the mass of carbon granules to strip fuel vapor therefrom. It is known to equip such prior fuel vapor storage canisters with a plastic foam screen between the mass of carbon granules and the purge port to minimize contamination of the solenoid valve in the canister purge duct by entrained carbon granules. Such foam screens are effective but may permit downstream migration of carbon granules in the circumstance that vibration of the storage canister shakes loose the plastic foam screen.

SUMMARY OF THE INVENTION

This invention is a new and improved fuel vapor storage canister having a screen assembly between a mass of carbon granules in the storage canister and a purge port of the storage canister. The fuel vapor storage canister includes a cup-shaped plastic body defining a carbon bed chamber and a plenum in the canister body at an end of the carbon bed chamber covered by the screen assembly. The screen assembly includes a pair of concentric cylindrical bosses around the plenum, a plastic foam screen over the plenum seated on a circular edge of each of the concentric cylindrical bosses, and a retainer having a plurality of flexible barbs and flexible reinforcements resiliently biased against opposite sides of the outermost one of the cylindrical bosses. Concentric circular segments of the plastic foam screen are compressed tightly between an annular planar side of the retainer and each of the circular edges of the concentric cylindrical bosses to positively prevent migration of carbon granules around the foam screen. The barbs prevent dislodgment of the retainer from the outermost one of the cylindrical bosses. The reinforcements protect the integrity of the retention of the barbs by preventing creep, i.e., plastic deformation over an extended period of time, of the outermost one of the cylindrical bosses attributable to the forces exerted thereon by the barbs.

DESCRIPTION OF THE PREFERRED EMBODIMENT

Figure 1:
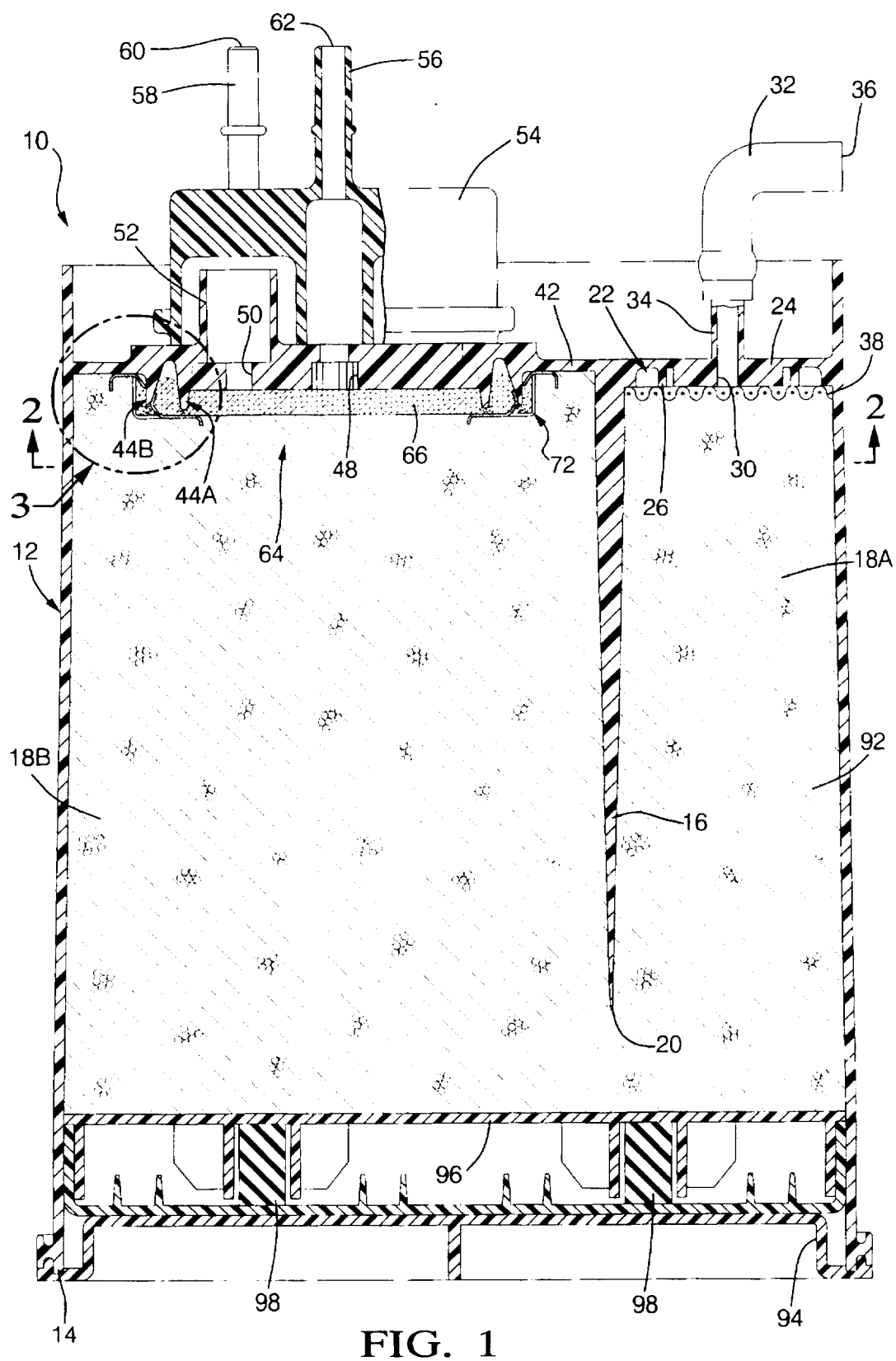
FIG. 1 is a sectional view in elevation of a fuel vapor storage canister according to this invention.

Referring to FIGS. 1–4, a fuel vapor storage canister 10 according to this invention includes a cup-shaped canister body 12 made of molded plastic open through an end 14 of the canister body. An integral partition 16 divides the canister body into a pair of carbon bed chambers 18A, 18B and terminates at an edge 20 inboard of the end 14 of the canister body.

A first plenum 22 of the vapor storage canister 10 is molded into the canister body 12 at an end 24 of the carbon bed chamber 18A and consists of a raised rectangular boss 26 on the canister body surrounding a plurality of linear bosses 28 on the canister body of the same height as the rectangular boss 26. The linear bosses radiate from an aperture 30 in the end 24 of the canister body 12 in the middle of the first plenum. A schematically represented tubular plastic elbow 32 is attached to a tubular boss 34 on the canister body around the aperture 30 and defines a vent port 36 of the vapor storage canister 10 through which the first plenum 22 communicates with the atmosphere surrounding the vapor storage canister. The first plenum 22 is covered by a conventional plastic foam screen 38 which seats on the rectangular boss 26 and on the linear bosses 28.

A second plenum 40 of the vapor storage canister 10 is molded into the canister body 12 at an end 42 of the carbon bed chamber 18B and consists of a pair of raised, concentric cylindrical bosses 44A, 44B on the canister body surrounding a plurality of linear bosses 46 on the canister body of the same height as the cylindrical bosses 44A, 44B. The linear bosses radiate from an aperture 48 in the end 42 of the carbon bed chamber 18B of the canister body in the middle of the second plenum. A polygon-shaped second aperture 50 in the end 42 of the carbon bed chamber 18B also communicates with the second plenum 40. On the opposite side of the end 42 of the carbon bed chamber 18B from the second plenum 40, the second aperture 50 is surrounded by a standpipe 52.

As seen best in FIG. 1, a housing 54 is attached to the end 42 of the carbon bed chamber 18B outside of the canister body over the apertures 48, 50. A first tubular boss 56 on the housing communicates directly and exclusively with the first aperture 48. A second tubular boss 58 on the housing 54 communicates exclusively with the polygon-shaped second aperture 50 through a serpentine flow path defined by the housing 54 and the standpipe 52. The second tubular boss 58 defines a vapor inlet port 60 of the vapor storage canister 10. The first tubular boss 56 defines a purge port 62 of the vapor storage canister 10. As seen best in FIGS. 2–4, a screen assembly 64 of the fuel vapor storage canister 10 includes a flat, disc-shaped plastic foam screen 66, an uninterrupted circular edge 68 around the second plenum 40 on the innermost one 44A of the pair of concentric cylindrical bosses 44A, 44B, an uninterrupted circular edge 70 on the outermost one 44B of the pair of concentric cylindrical bosses 44A, 44B, and a retainer 72. The plastic foam screen 66 seats on and overlaps radially each of the circular edges 68, 70 thereby to cover the second plenum between the carbon bed chamber 18B and the vapor purge port 62. Pores, not shown, in the plastic foam screen 66 capture particles of on the order of 350 microns and larger entrained in a gaseous flow through the screen.

The retainer 72 is preferably made of stamped sheet metal and includes an annular planar side 74, a cylindrical wall 76 perpendicular to the planar side, and a lip 78 around the cylindrical wall. An inner edge 80 of the annular planar side 74 defines a circular window of the retainer. The cylindrical wall 76 has a diameter dimension "D", FIG. 2, slightly greater than the diameter of the outermost one 44B of the concentric cylindrical bosses 44A, 44B on the canister body and a plurality of rectangular perforations 82 which overlap the lip 78. A plurality of flexible barbs 84 integral with the retainer are disposed in respective ones of the rectangular perforations 82 and protrude to within the cylindrical wall 76 of the retainer. A plurality of flexible reinforcements 85 integral with the retainer 72 are disposed in respective ones of the rectangular perforations 82 opposite the barbs therein and protrude to within the cylindrical wall 76 of the retainer. Each reinforcement 85 has a knee 86 facing a distal end 87 of the corresponding one of the barbs 84, FIG. 3.

Figure 2:
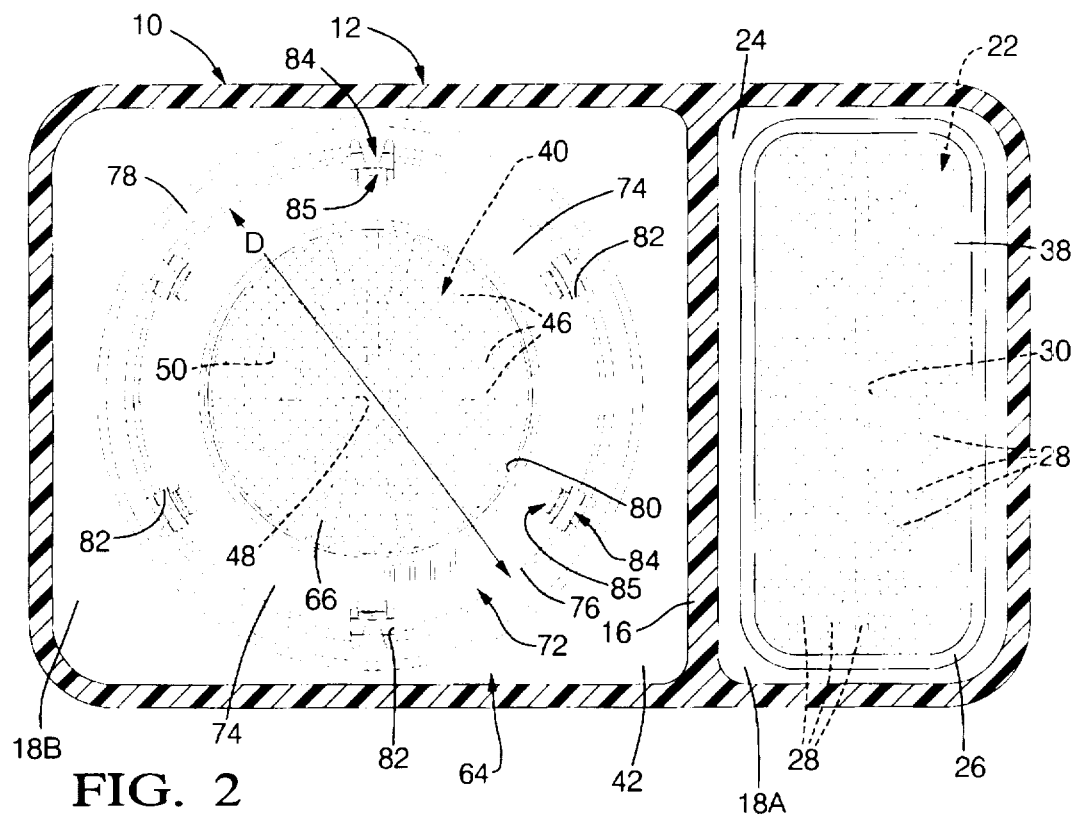
FIG. 2 is a sectional view taken generally along the plane indicated by lines 2—2 in FIG. 1.
Figure 3:
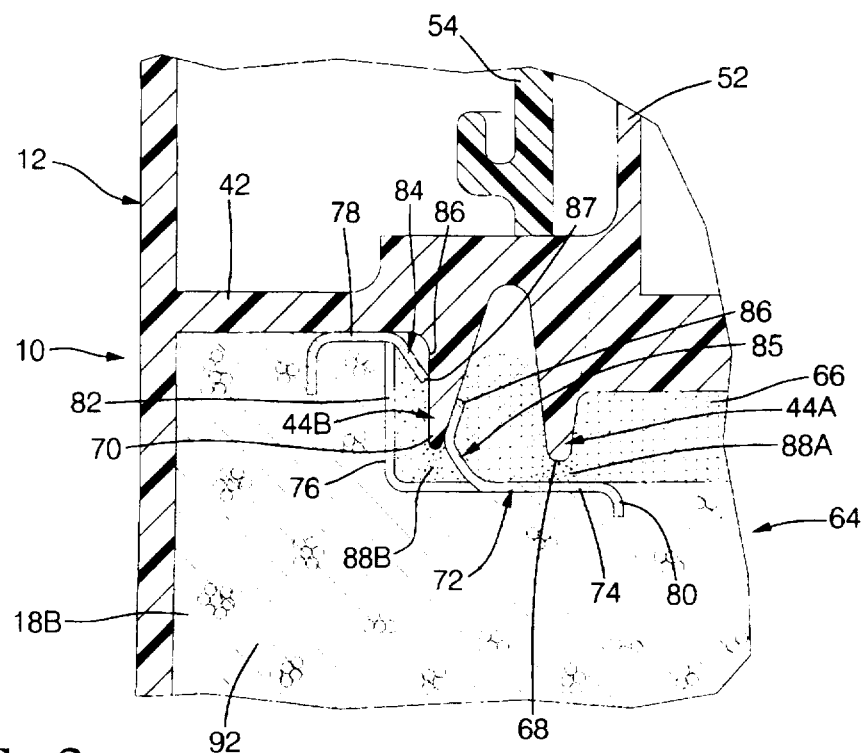
FIG. 3 is an enlarged view of the portion of FIG. 1 in the reference circle 3.
Figure 4:
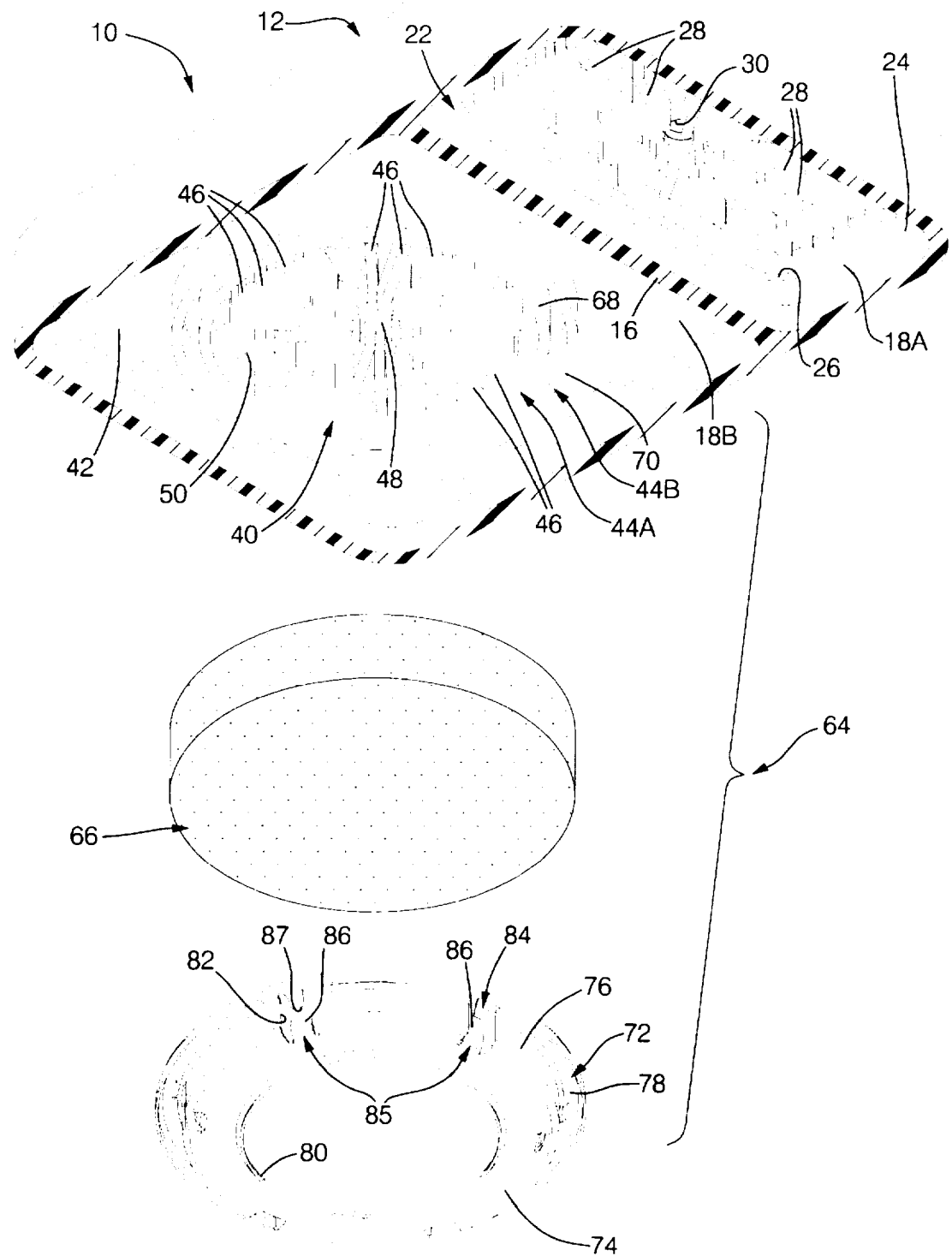
FIG. 4 is a fragmentary, exploded perspective view of the fuel vapor storage canister according to this invention illustrating a screen assembly thereof detached from a canister body thereof.

The retainer 72 is pushed over the outermost one 44B of the concentric cylindrical bosses 44A, 44B on the canister body to a seated position, FIGS. 1-3, in which a pair of concentric circular segments 88A, 88B of the plastic foam screen 66, FIG. 3, are compressed between the planar side 74 of the retainer and each of the circular edges 68, 70 of the concentric cylindrical bosses 44A, 44B. Concurrently, the barbs 84 are resiliently flexed radially outward on one side of the outermost one 44B of the cylindrical bosses 44A, 44B while the reinforcements 85 pierce the foam screen and are resiliently flexed radially inward on the other side of the cylindrical boss 44B. In the seated position of the retainer, the distal ends 87 of the flexed barbs 84 penetrate slightly the surface of the side of the outermost one 44B of the cylindrical bosses 44A, 44B to prevent dislodgment of the retainer therefrom. The knees 86 of the flexed reinforcements 85 induce reaction forces on the cylindrical boss 44B opposite the reaction forces induced by the barbs 84 to protect the integrity of the retention attributable to the barbs by preventing creep, i.e., plastic deformation over an extended period of time, of the cylindrical boss 44B induced by the forces exerted thereon by the barbs.

After the foam screen 38 and the screen assembly 64 are in place over the first and the second plenums 22, 40, respectively, the canister body 12 is filled through its open end 14 with a mass 92 of carbon granules to above the edge 20 of the partition 16. A cover 94 seals closed the open end of the canister body. A plate 96 between the cover 94 and the mass 92 of carbon granules is biased against the latter by a pair of elastomeric springs 98 to compact the mass of carbon granules in the canister body.

Figure 5:
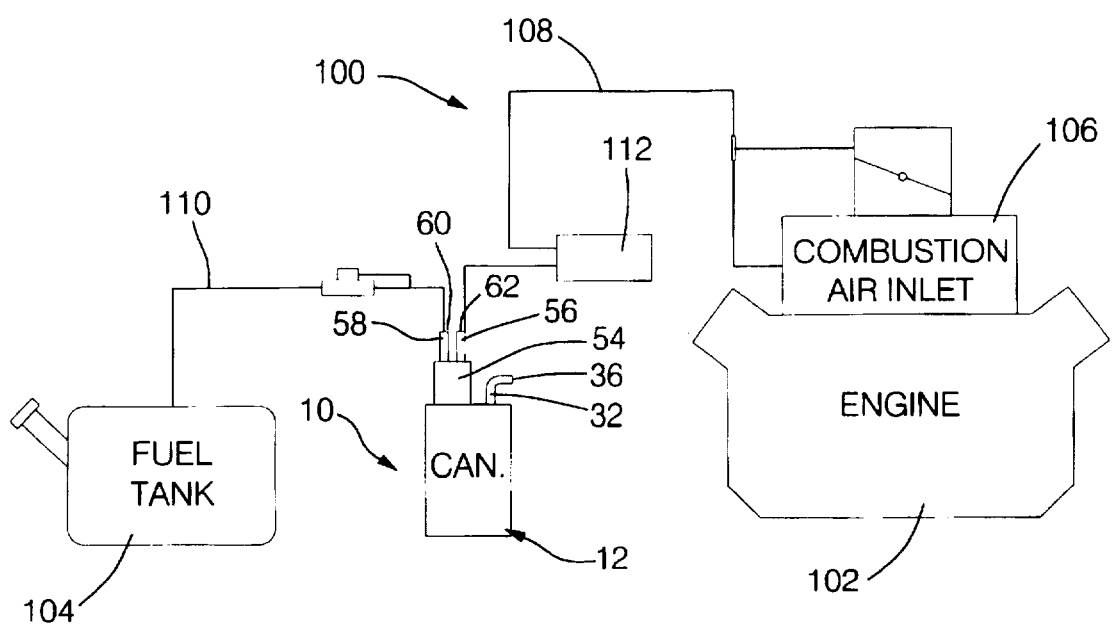
FIG. 5 is a fragmentary, schematic representation of a motor vehicle evaporative emission control system including the fuel vapor storage canister according to this invention.

Referring to FIG. 5, the vapor storage canister 10 is incorporated in a schematically and fragmentarily illustrated evaporative emission control system 100 of a motor vehicle between a motor 102 of the vehicle and a fuel tank 104 of the vehicle. A combustion air inlet 106 of the motor 102 is connected to the purge port 62 of the vapor storage canister 10 through a vapor purge duct 108. The fuel tank 104 of the motor vehicle is connected to the vapor inlet port 60 of the storage canister 10 through a vapor transfer duct 110. A solenoid valve 112 in the purge duct 108 opens and closes the purge duct when the motor 102 is on and off, respectively. Vapor pressure in the fuel tank 104 induces a flow of a mixture of fuel vapor and air to the carbon bed chamber 18B through the vapor transfer duct 110, the vapor inlet port 60, and the portion of the plastic foam screen 66 exposed to the carbon bed chamber 18B through the aforesaid circular window in the retainer 72. The standpipe 52 and the aforesaid serpentine flow path within the housing 54 cooperate to prevent any liquid fuel in the vapor transfer duct 110 from entering the carbon bed chamber 18B. Inside the canister body, the fuel vapor and air mixture circulates through the mass 92 of carbon granules in the carbon bed chambers 18A, 18B toward the vent port 36 during which circulation the carbon granules strip the vapor from the mixture so that only uncontaminated air is expelled through the vent port.

The solenoid valve 112 closes the purge duct 108 when the motor 102 is off to prevent escape of fuel vapor from the canister body through the purge duct.

When the motor is on, the combustion air inlet 102 of the motor is at subatmospheric pressure and the solenoid valve 112 opens the purge duct 108. The pressure gradient between the combustion air inlet 106 and the vent port 36 of the vapor storage canister 10 induces a flow of fresh air through the carbon bed chambers 18A, 18B from the vent port toward the purge port 62. The fresh air strips fuel vapor from the mass 92 of carbon granules in the canister body to produce a gaseous mixture of air and fuel vapor which flows to the combustion air inlet 106 through the portion of the plastic foam screen 66 exposed to the carbon bed chamber 18B through the aforesaid circular window in the retainer 72, the second plenum 40, the vapor purge port 62, and the purge duct 108.

The plastic screen 66 traps carbon granules entrained in such gaseous mixture to prevent contamination of the solenoid valve 112 in the purge duct 108 downstream of the purge port 62. The concentric compressed circular segments 88A, 88B of the plastic foam screen define a pair of seals in series which prevent migration of carbon granules around the foam screen from the carbon bed chamber 18B to the second plenum 40. Importantly, the flexed barbs maintain the integrity of the seals at the concentric compressed circular segments 88A, 88B of the plastic foam screen by preventing dislodgment of the retainer from its seated position. Accordingly, even in the circumstance that the vapor storage canister 10 experiences substantial vibration and significant temperature excursions, the screen assembly 64 prevents migration of carbon granules from the carbon bed chamber 18B to the second plenum 40 around the plastic foam screen.

We claim:

1. A fuel vapor storage canister for a motor vehicle evaporative emission control system including a cup-shaped canister body having a vent port through which said canister body communicates with the atmosphere surrounding said fuel vapor storage canister and a purge port through which said canister body communicates with a region of subatmospheric pressure to induce a flow of air through said canister body from said vent port to said port, a mass of carbon granules in said canister body, a plenum in said canister body exposed to said mass of carbon granules therein and connected to said purge port, and a screen assembly between said plenum and said mass of carbon granules in said canister body, characterized in that said screen assembly comprises:

a pair of concentric cylindrical bosses on said canister body around said plenum each having an uninterrupted circular edge thereon, a flat foam screen over said plenum overlapping each of said pair of concentric cylindrical bosses and seated on each of said uninterrupted circular edges thereof, a retainer over said flat foam screen having an annular planar side around a window in said retainer and a seated position on said pair of concentric cylindrical bosses in which said flat foam screen is exposed to said mass of carbon granules through said window and a pair of concentric segments of said flat foam screen are compressed between said annular planar side of said retainer and respective ones of said uninterrupted circular edges on said pair of concentric cylindrical bosses to define a pair of seals preventing migration of carbon granules to said plenum around said flat foam screen, and a plurality of flexible one-way barbs on said retainer each having a distal end biased against a first side of an outermost one of said pair of concentric cylindrical bosses to prevent dislodgment of said retainer from said seated position.

2. The fuel vapor storage canister recited in claim 1 further comprising:

a plurality of flexible reinforcements on said retainer each having a knee opposite said distal end of a corresponding one of said plurality of barbs on said retainer and bearing against a second side of said outermost one of said pair of concentric cylindrical bosses in said seated position of said retainer to counter the forces on said outermost one of said pair of concentric cylindrical bosses induced by said flexible barbs.

* * * * *